(12) United States Patent
Tavallaee et al.

(10) Patent No.: US 11,503,055 B2
(45) Date of Patent: Nov. 15, 2022

(54) IDENTIFYING SIEM EVENT TYPES

(71) Applicant: International Business Machines Corporation, Armonk, NY (US)

(72) Inventors: Mahbod Tavallaee, Markham (CA); Aankur Bhatia, Bethpage, NY (US)

(73) Assignee: International Business Machines Corporation, Armonk, NY (US)

( * ) Notice: Subject to any disclaimer, the term of this patent is extended or adjusted under 35 U.S.C. 154(b) by 297 days.

(21) Appl. No.: 17/026,501

(22) Filed: Sep. 21, 2020

(65) Prior Publication Data

US 2022/0094704 A1 Mar. 24, 2022

(51) Int. Cl.
*H04L 9/40* (2022.01)
*G06N 20/00* (2019.01)
*G06F 16/28* (2019.01)

(52) U.S. Cl.
CPC ........ *H04L 63/1425* (2013.01); *G06F 16/285* (2019.01); *G06N 20/00* (2019.01); *H04L 63/1416* (2013.01)

(58) Field of Classification Search
None
See application file for complete search history.

(56) References Cited

U.S. PATENT DOCUMENTS

| | | |
|---|---|---|
| 8,079,081 B1 | 12/2011 | Lavrik et al. |
| 9,064,210 B1 | 6/2015 | Hart |
| 10,581,888 B1 | 3/2020 | Agranonik et al. |
| 2017/0063908 A1 | 3/2017 | Muddu et al. |
| 2019/0130009 A1 | 5/2019 | McLean |
| 2020/0065220 A1 | 2/2020 | Sobran |
| 2020/0233857 A1 | 7/2020 | Fehling |
| 2020/0327221 A1* | 10/2020 | Street ................ H04L 63/1425 |
| 2021/0037032 A1* | 2/2021 | Soeder ................ G06N 3/0454 |
| 2021/0281592 A1* | 9/2021 | Givental ............... G06N 20/10 |

FOREIGN PATENT DOCUMENTS

| | | |
|---|---|---|
| CN | 110958136 A | 4/2020 |
| WO | 2019169147 A1 | 9/2019 |

OTHER PUBLICATIONS

Stroeh et al., "An approach to the correlation of security events based on machine learning techniques", Journal of Internet Services and Applications, 2013, Abstract Only, 10 pages.

(Continued)

*Primary Examiner* — Cai Y Chen
(74) *Attorney, Agent, or Firm* — Donald J. O'Brien

(57) ABSTRACT

Embodiments of a method are disclosed. The method includes determining that the event type of an event log of a security information and event management (SIEM) cannot be identified. The method further includes generating a vectorized log using a cleaned, tokenized, and padded version of the event log. Additionally, the method includes generating a classification for the vectorized log using a deep learning classification model that is trained to identify a potential event type for the event log based on deep learning training using multiple parsed logs. The method also includes determining that a confidence level of the classification meets a predetermined threshold. The method further includes parsing the event log based on the classification.

25 Claims, 7 Drawing Sheets

(56) References Cited

OTHER PUBLICATIONS

Azodi et al., "Pushing the Limits in Event Normalisation to Improve Attack Detection in IDS/SIEM Systems", 2013 International Conference on Advanced Cloud and Big Data, Dec. 13-15, 2013, pp. 69-76.

Jaeger et al., "Normalizing Security Events with a Hierarchical Knowledge Base", IFIP International Conference on Information Security Theory and Practice, WISTP 2015: Information Security Theory and Practice, Conference paper First Online: Oct. 24, 2015, Abstract Only, 5 pages.

Mell et al., "The NIST Definition of Cloud Computing", Recommendations of the National Institute of Standards and Technology, Sep. 2011, 7 pages.

"Patent Cooperation Treaty PCT Notification of Transmittal of the International Search Report and the Written Opinion of the International Searching Authority, or the Declaration", Applicant's file reference IEE210484PCT, International Application No. PCT/CN2021/106854, International Filing Date Jul. 16, 2021, dated Oct. 14, 2021, 9 pages.

* cited by examiner

IDENTIFYING SIEM EVENT TYPES

BACKGROUND

The present disclosure relates to security information and event management (SIEM), and more specifically, to identifying SIEM event types.

The term, SIEM, can refer to software tools and/or services that combine the management of security information and security events, i.e., security incidents. In this way, the SIEM can analyze logs that are generated by a computer system and/or computer network to identify potential security incidents in real-time.

Typically, a security analyst can identify threats to networked computer systems by analyzing the transactions, i.e., events, that come into these systems. These events are recorded in logs. However, because of the volume of logs, it can be challenging for security analysts to process the log data in the raw format in time to mitigate any potential damage. Thus, the SIEM can process these logs in a process called event normalization and categorization, whereby the SIEM generates offenses that the security analyst can review. Offenses are events that the SIEM identifies as potential security incidents. In event normalization and categorization, the SIEM identifies the type and source of the event, and passes the event into a parser based on the identified type. The parser can use a regular expression (regex), which applies rules to the log that can determine whether to generate an offense.

However, regular expressions look for an exact match to a predefined pattern, which means new events or variation of old events may not be normalized and categorized properly. These unknown logs miss important pieces of information such as the event name or the category. These logs are useless as they cannot be found in common searches and they cannot trigger the correlation rules as well, which may result in missing damaging security incidents. In some scenarios, between five 5-20% of events are not properly normalized and categorized, which means millions of events can be overlooked by security analysts and other monitoring tools.

SUMMARY

Embodiments of a method are disclosed. The method includes determining that the event type of an event log of a security information and event management (SIEM) cannot be identified. The method further includes generating a vectorized log using a cleaned, tokenized, and padded version of the event log. Additionally, the method includes generating a classification for the vectorized log using a deep learning classification model that is trained to identify a potential event type for the event log based on deep learning training using multiple parsed logs. The method also includes determining that a confidence level of the classification meets a predetermined threshold. The method further includes parsing the event log based on the classification. Advantageously, such embodiments are useful for identifying event types for logs that the STEM cannot identify.

Optionally, in some embodiments, the method further includes training the deep learning classification model using a convolutional neural network. Such embodiments are useful for identifying parsers for logs for which the SIEM cannot identify the parser.

An additional embodiment is disclosed for a method. The method includes generating a vectorized log using a cleaned, tokenized, and padded version of the event log. The method further includes generating a classification for the vectorized log using a deep learning classification model that is trained to identify a potential event type for the event log based on deep learning training using a plurality of parsed logs. The method also includes determining that a confidence level of the classification meets a predetermined threshold. The method additionally includes parsing the event log based on the classification. Advantageously, such embodiments are useful for identifying event types for logs that the SIEM cannot identify.

An additional embodiment is disclosed for a method. The method includes determining that an event type of an event log of a security information and event management (SIEM) cannot be identified. The method further includes generating a vectorized log using a cleaned, tokenized, and padded version of the event log. The method also includes generating a classification for the vectorized log using a deep learning classification model that is trained to identify a potential event type for the event log based on deep learning training using parsed logs. The method further includes determining that a confidence level of the classification meets a predetermined threshold. The method additionally includes parsing the event log based on the classification. Advantageously, such embodiments are useful for identifying event types for logs that the SIEM cannot identify.

Further aspects of the present disclosure are directed toward systems and computer program products with functionality similar to the functionality discussed above regarding the computer-implemented methods. The present summary is not intended to illustrate each aspect of every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

DETAILED DESCRIPTION

As stated previously, in event normalization and categorization, the SIEM identifies the type and source of the event and passes the event into a parser based on the identified type. The parser can use a regular expression (regex), which applies rules to the log that can determine whether to generate an offense. However, regular expressions look for an exact match to a predefined pattern, which means new events or variation of old events may not be normalized and categorized properly. These unknown logs miss important pieces of information such as the event name or the category. These logs are useless as they cannot be found in common searches and they cannot trigger the correlation rules as well, which may result in missing damaging security incidents. In some scenarios, between five 5-20% of events are not properly normalized and categorized, which means millions of events can be overlooked by security analysts and other monitoring tools.

Accordingly, some embodiments of the present disclosure can train a machine learning model to identify event types where the logs do not match a predefined pattern. Further, when the SIEM encounters an unrecognized event type, the SIEM can pass the log to the trained machine learning model, which can identify the event type. In this way, the SIEM may assign a corresponding parser, which can determine whether to generate an offense for the log.

Figure 1:
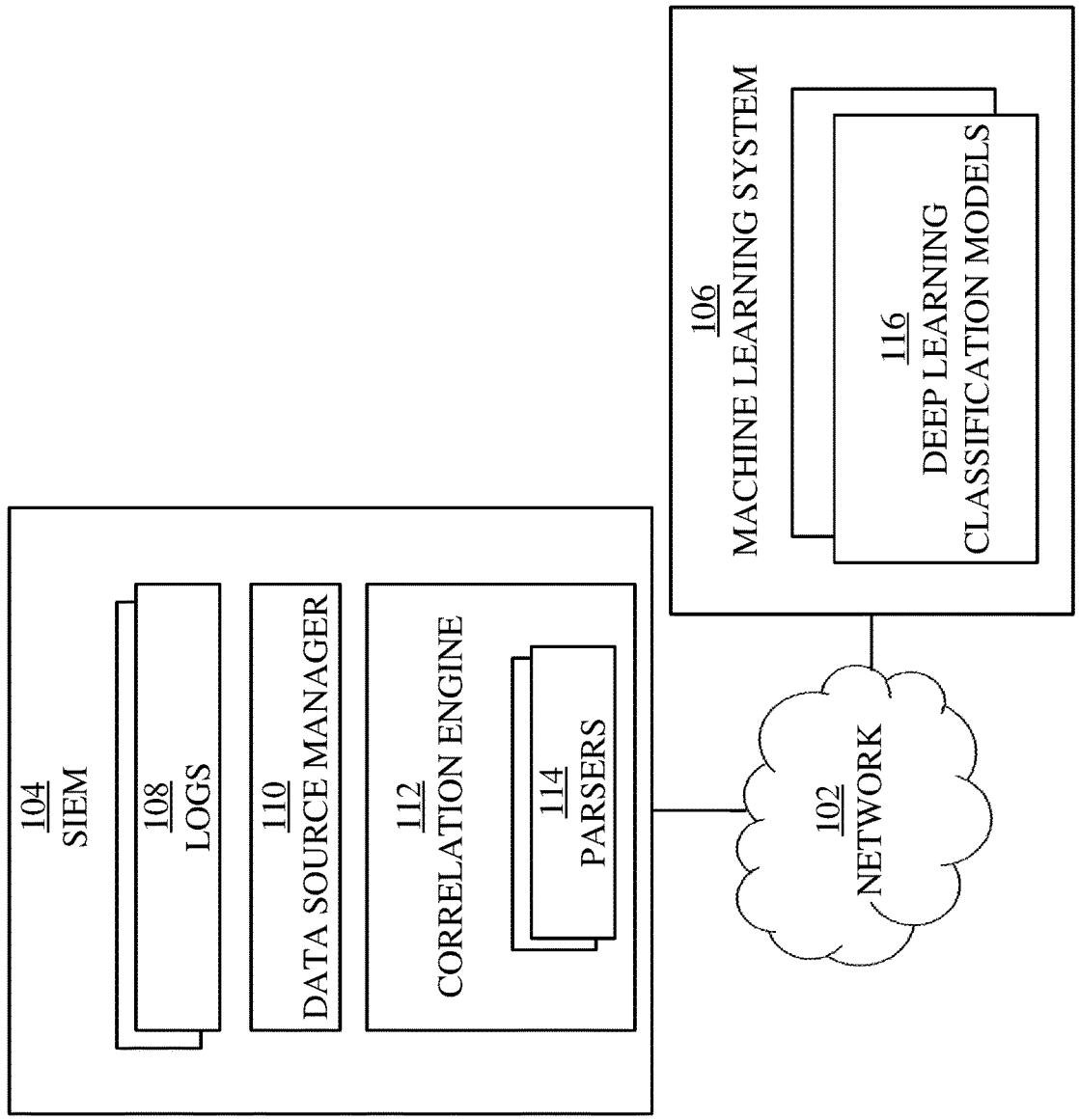
FIG. 1 is a block diagram of an example system for identifying SIEM event types, in accordance with some embodiments of the present disclosure.

FIG. 1 is a block diagram of an example system 100 for identifying SIEM event types, in accordance with some embodiments of the present disclosure. The system 100 includes a network 102, SIEM 104, and machine learning system 106.

The network 102 may include one or more computer communication networks. An example network 102 can include the Internet, a local area network (LAN), a wide area network (WAN), a wireless network such as a wireless LAN (WLAN), or the like. Network 102 may comprise copper transmission cables, optical transmission fibers, wireless transmission, routers, firewalls, switches, gateway computers and/or edge servers. A network adapter card or network interface in each computing/processing device implemented as part of the SIEM 104, for example, may receive messages and/or instructions from and/or through network 102, and forward the messages and/or instructions for storage or execution (or the like) to a respective memory or processor of the respective computing/processing device. Though network 102 is depicted as a single entity in FIG. 1 for purposes of illustration, in other examples network 102 may include a plurality of private and/or public networks over which the components of the system 100 may communicate.

The STEM 104 can be a system of software tools and/or services that combine the management of security information and security events, i.e., security incidents. In this way, STEM can analyze alerts that are generated by a computer system and/or computer network (about potential security incidents) in real-time. The STEM can perform historical analysis of security data, using correlated indicators of security incidents with machine-generated data, e.g., alerts. With a SIEM, security incidents can be investigated on an individual basis. However, with a SIEM, it may be possible to determine if there is a relationship between two elements, e.g., computer applications, of a past security incident given the SIEM's knowledge about those elements.

In accordance with some embodiments of the present disclosure, the SIEM 104 can include logs 108, data source manager (DSM) 110, and correlation engine 112. The logs 108 can be records of the events that occur on a networked computer system (not shown). The logs 108 can include multiple fields arranged in a specific sequence. The fields can include data used in a computer transaction based on the event type. The correlation engine 112 can include the parsers 114, which can apply correlation rules to the logs 108 that can generate offenses for potential security incidents.

The data source manager 110 can identify event types for each of the logs 108. More specifically, the data source manager 110 can map each log 108 to standard event names, categories, and log source types based on known log patterns defined by regular expressions. However, in some cases, the log 108 may not match a known log pattern. For example, a malicious actor may attempt to disguise an event by inserting a poison pill in the log 108 that prevents the data source manager 110 from identifying the event type. In such cases, the data source manager 110 can assign a parser 114 to the log 108 based on the event name, category, and log source type identified by the deep learning classification models 116.

The machine learning system 106 can use logs 108 having identified events to train deep learning classification models 116 to label logs 108 with unidentified events. Thus, the deep learning classification models 116 can be machine learning models that label the logs 108 with an event type. Machine learning is a process wherein a computer algorithm is trained to make a specific classification. For example, machine learning algorithms (learners) can be trained to identify classes of objects in a digital photograph, predict a future shopping choice of a potential customer in a marketing database, and the like. According to some embodiments of the present disclosure, the deep learning classification models 116 are trained to label the logs 108 with the event type based on the fields included in the log 108 and the sequence within which the fields occur. Deep learning is part of a broader family of machine learning methods based on neural networks—algorithms inspired by the human brain—that learn from relatively large amounts of data. Deep learning algorithms perform a task repeatedly and gradually improve the outcome by using deep layers that enable progressive learning. According to some embodiments of the present disclosure, the deep learning classification models 116 can be trained using logs 108 that the data store manager 110 successfully identifies using event normalization and categorization.

Figure 2:
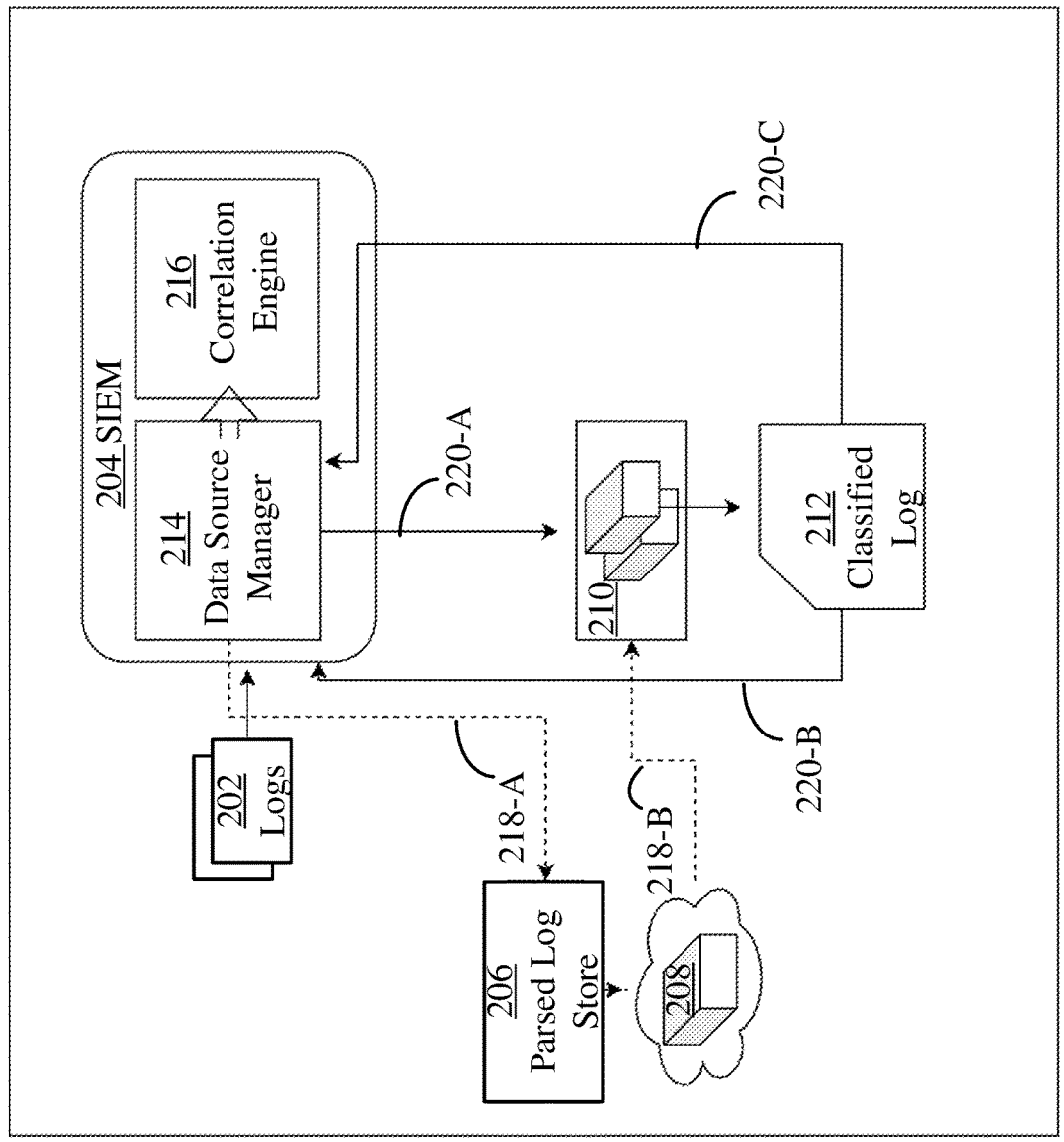
FIG. 2 is an example system for identifying SIEM event types, in accordance with some embodiments of the present disclosure.

FIG. 2 is an example system 200 for identifying SIEM event types, in accordance with some embodiments of the present disclosure. The system 200 includes logs 202, SIEM 204, parsed log store 206, machine learning system 208, deep learning classification models 210, and classified logs 212. The logs 202, SIEM 204, machine learning system 208, and deep learning classification models 210 are similar, respectively, to the logs 108, machine learning system 106, SIEM 104, and deep learning classification models 116 described with respect to FIG. 1. Further, the SIEM 204 includes data source manager 214 and correlation engine 216, which are similar to the data source manager 110 and correlation engine 112.

The parsed log store 206 can include a collection of logs 202 that the SIEM 204 successfully labels based on known log patterns. Accordingly, the machine learning system 208 can continuously perform deep learning on the parsed log store 206 to generate the deep learning classification models 210. The lines 218-A, 218-B represent the input of the parsed log into the parsed log store 206, and the output of the deep learning classification models 210 from the machine learning system 208.

According to some embodiments of the present disclosure, when the data source manager 214 cannot determine the event type, the log 202 can be input to the deep learning classification models 210. The lines 220-A, 220-B, 220-C represent the flow of logs that the data source manager 214 cannot identify. Line 220-A represents the input of unparsed logs to the deep learning classification models 210. Accordingly, the deep learning classification models 210 can assign a probability that an unparsed log may be for one or more event types. Further, the deep learning classification models 210 can output a classified log 212. The classified log 212 can include the unparsed log with the event type having the relatively highest probability. Additionally, the classified log 212 can include a log source type and an event name based on the probabilities assigned by the deep learning classification models 210.

In some embodiments of the present disclosure, a predetermined threshold may indicate whether to use the classified log 212 for assigning the parser. For example, if the deep learning classification models 210 indicate that the probability of the classification is less than a predetermined threshold of 50%, the STEM 204 may not use the classified log for further parsing. Accordingly, the line 220-B can represent the flow of the classified log 212 back to the STEM 204 for a manual process to determine the appropriate parser. However, if the probability of the classification meets or exceeds the predetermined threshold, the line 220-C can represent the flow of the classified log 212 back to the STEM 204, which may assign the parser based on the classification. Further, the STEM 204 can provide the classified log 212 to the correlation engine 216, which may parse the classified log 212 based on the identified event type.

Figure 3:
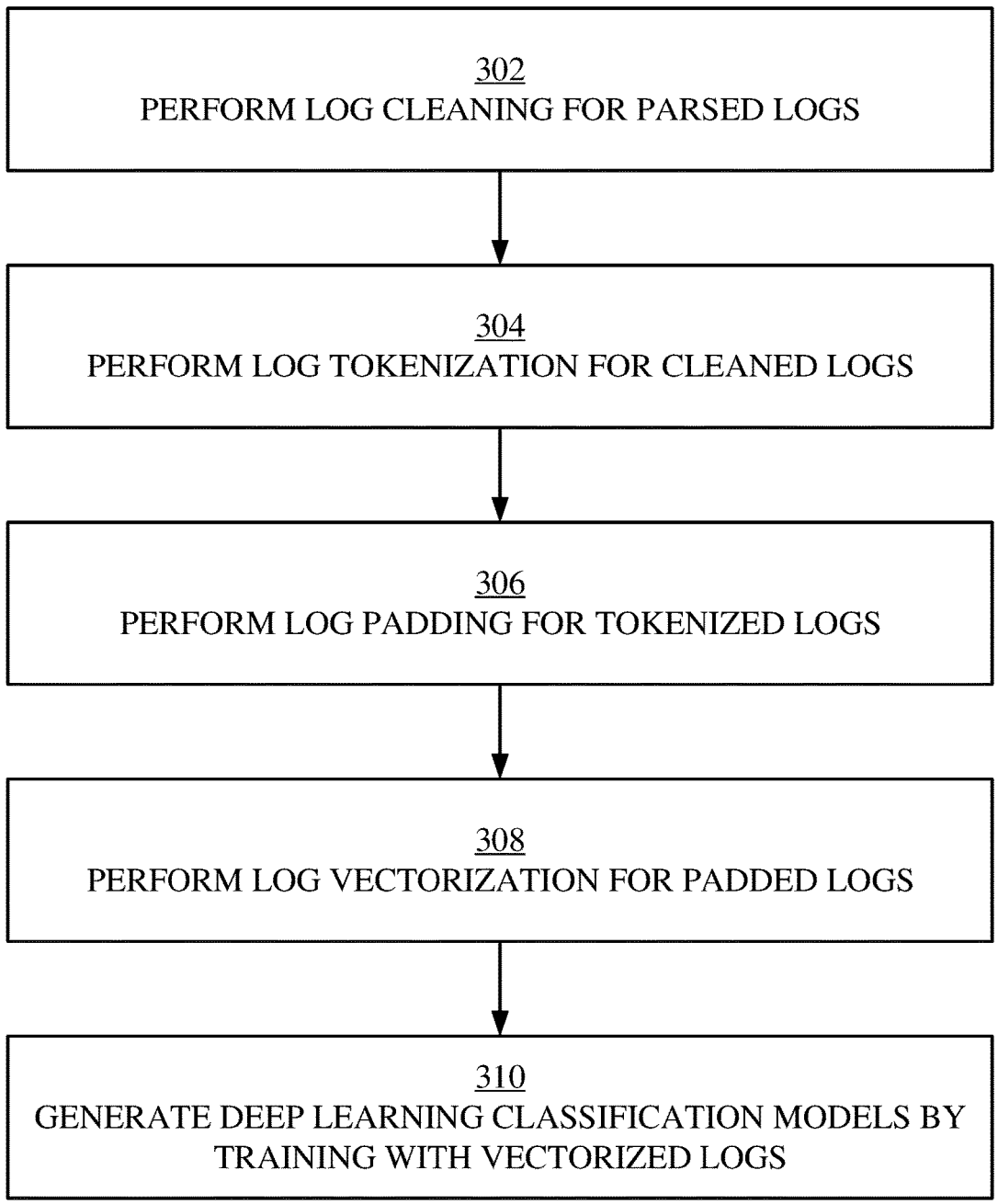
FIG. 3 is a process flow diagram of a method for training a deep learning classification model, in accordance with some embodiments of the present disclosure.

FIG. 3 is a process flow diagram of a method 300 for training deep learning classification models, in accordance with some embodiments of the present disclosure. In some embodiments of the present disclosure, the machine learning system 106, described with respect to FIG. 1, may perform the method 300.

At operation 302, the machine learning system 106 can perform log cleaning for parsed logs. The parsed logs can be logs, such as logs 108, that the data source manager 110 can successfully identify based on known log patterns. Log cleaning can involve filtering out irrelevant information from the logs 108, such as, dates, time stamps, filenames, uniform resource locators, punctuation, and the like. After filtering out such extraneous information, the logs 108 may be limited to field names and data within the logs 108.

At operation 304, the machine learning system 106 can perform log tokenization for the cleaned logs. Log tokenization can involve reducing the log to a list of field names and data within the cleaned log.

At operation 306, the machine learning system 106 can perform log padding for the tokenized logs. In order to facilitate comparisons between the logs, it is useful to make all the fields across the logs the same field length. Accordingly, the machine learning system 106 can identify the field length of the longest token within the tokenized logs, and pad each token that is shorter than the longest field with a character, e.g., a space or zero, such that all tokens across all the tokenized logs are the same length.

At operation 308, the machine learning system 106 can perform log vectorization for the padded logs. It can be challenging for machine learning systems to perform classifications using textual tokens. Thus, the machine learning system 106 can assign a number to each token appearing in the padded logs, such that the same token appearing in different logs has the same number. In this way, it is possible for the machine learning system to learn to identify event types based on the tokens appearing in a log and the sequence within which the tokens appear.

At operation 310, the machine learning system 106 can generate the deep learning classification models 116 by training with the vectorized logs. Because the source logs of the vectorized logs are successfully labeled, the deep learning classification models 116 can use the patterns of the vectorized logs to learn how to identify event types. According to some embodiments of the present disclosure, the machine learning system 106 can use a convolutional neural network (CNN) to train the deep learning classification models 116.

A CNN is a neural network defined in layers where the first layers identify relatively fewer complex features, and the later layers can identify more complex features based on the features identified in the earlier layers. One example of such feature detection in a CNN involves detecting faces in images. In such an example, the first layers of the CNN can identify vertical and horizontal lines within the image. Later layers in such a CNN can identify noses and mouths based on the earlier identified lines. According to some embodiments of the present disclosure, the early layers of the CNN can identify specific tokens. Further, later layers of the CNN can identify specific groups and sequences of tokens. In this way, the CNN can enable the deep learning classification models 116 to identify event types in the vectorized logs.

Figure 4:
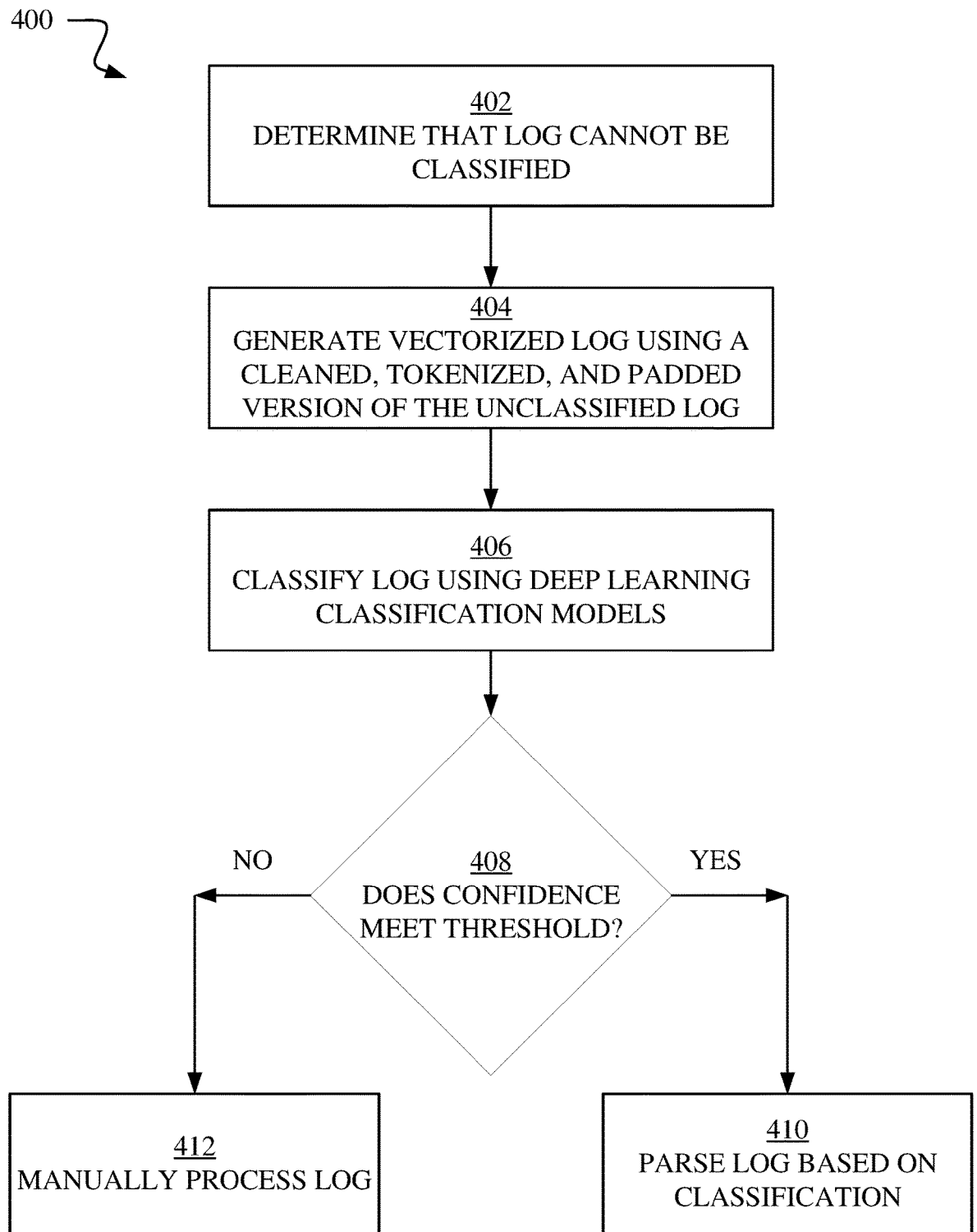
FIG. 4 is a process flow diagram of a method for identifying SIEM event types, in accordance with some embodiments of the present disclosure.

FIG. 4 is a process flow diagram of a method 400 for identifying SIEM event types, in accordance with some embodiments of the present disclosure. In some embodiments of the present disclosure, the data source manager 110, described with respect to FIG. 1, may perform the method 400.

At operation 402, the data source manager 110 can determine that a log 108 cannot be classified. As stated previously, if the log 108 does not match the predefined pattern of a regex, the data source manager 110 can determine that the log 108 cannot be classified. For example, a malicious actor can insert poison data into the log 108 to prevent the data source manager 110 from identifying the event type of the log 108, and thus prevent parsing that can generate an offense for analysis.

At operation 404, the data source manager 110 can generate a vectorized log using a cleaned, tokenized, and padded version of the unclassified log. The data source manager 110 can generate the vectorized log according to operations 302 through 308 described with respect to FIG. 3.

Referring back to FIG. 4, at operation 406, the data source manager 110 can classify the vectorized log using the deep learning classification models 116. Classifying the vectorized log can involve generating one or more potential labels for the log source type, event name, and parser, along with a probability that the potential label is the correct one. Further, the deep learning classification models 116 can thus provide the label with the comparatively highest probability. The probability is also referred to herein as the confidence of the classification.

At operation 408, the data source manager can determine whether the confidence of the classification meets a predetermined threshold. The predetermined threshold can represent a confidence level at which the data source manager 110 can determine the classification is correct. In some embodiments of the present disclosure, the predetermined threshold can be 50%. Thus, if the confidence of the classification is 50% or higher, the method 400 may flow to operation 410. If the confidence of the classification is below 50%, the method 400 may flow to operation 412.

At operation 410, the data source manager 110 can parse the log 108 based on the classification. Parsing the log 108 can involve passing the log and the classification to a correlation engine, such as the correlation engine 112 described with respect to FIG. 1.

At operation 412, the data source manager can invoke a manual process for parsing the log. Because the confidence of the classification is below the predetermined threshold, attempting to parse the log based on the classification may result in errors. Accordingly, it may be useful to use a manual process to parse the log.

Figure 5:
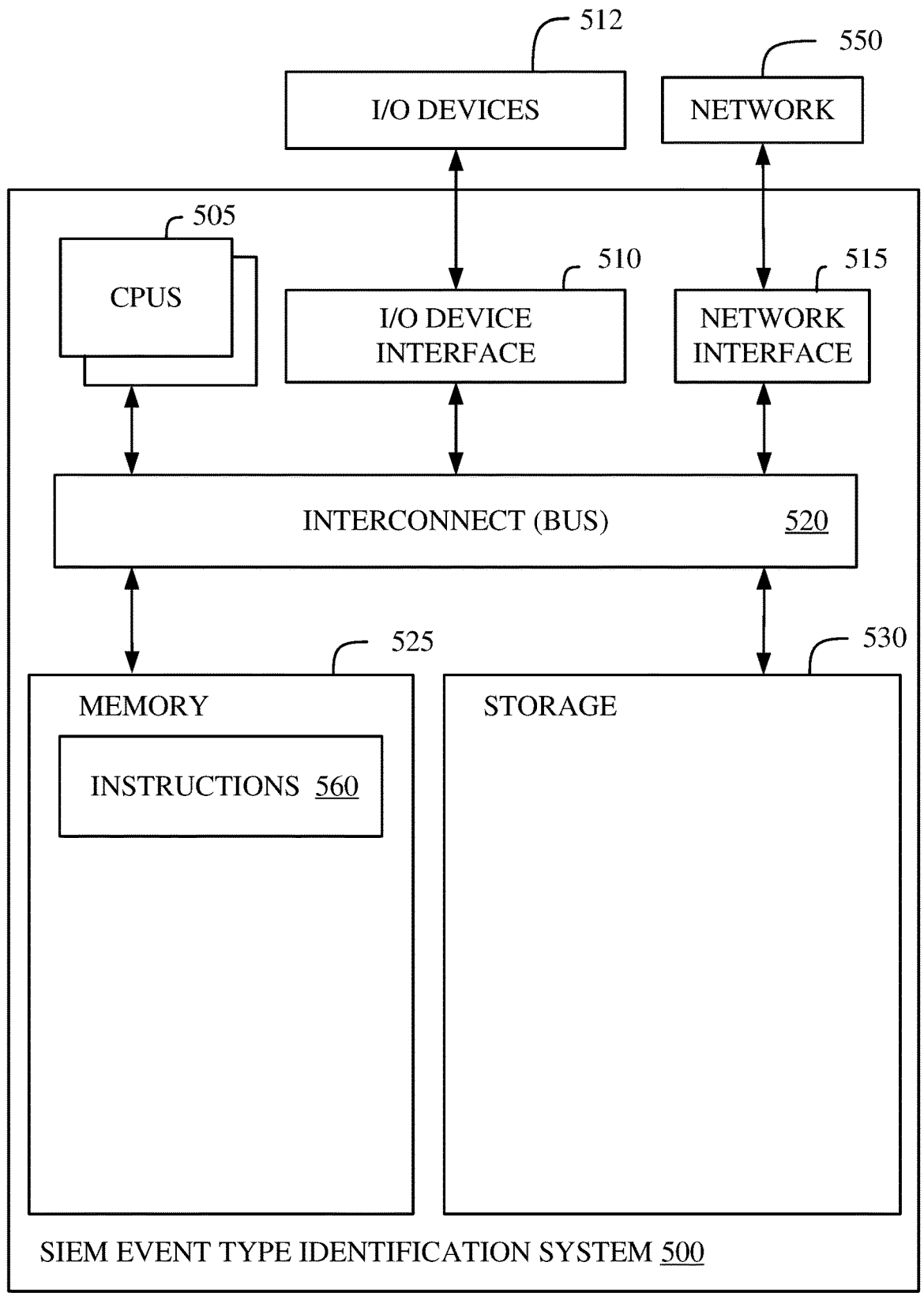
FIG. 5 is a block diagram of an example SIEM event type identification system, in accordance with some embodiments of the present disclosure.

FIG. 5 is a block diagram of an example SIEM event type identification system 500, in accordance with some embodiments of the present disclosure. In various embodiments, the SIEM event identification system 500 is similar to the data source manager 110 and the machine learning system 106 described with respect to FIG. 1, and can perform the methods described in FIGS. 3-4, and/or the functionality discussed in FIGS. 1 and 2. In some embodiments, the SIEM event identification system 500 provides instructions for the aforementioned methods and/or functionalities to a client machine such that the client machine executes the method, or a portion of the method, based on the instructions provided by the SIEM event identification system 500. In some embodiments, the SIEM event identification system 500 comprises software executing on hardware incorporated into a plurality of devices.

The SIEM event identification system 500 includes a memory 525, storage 530, an interconnect (e.g., BUS) 520, one or more CPUs 505 (also referred to as processors 505 herein), an I/O device interface 510, I/O devices 512, and a network interface 515.

Each CPU 505 retrieves and executes programming instructions stored in the memory 525 or the storage 530. The interconnect 520 is used to move data, such as programming instructions, between the CPUs 505, I/O device interface 510, storage 530, network interface 515, and memory 525. The interconnect 520 can be implemented using one or more busses. The CPUs 505 can be a single CPU, multiple CPUs, or a single CPU having multiple processing cores in various embodiments. In some embodiments, a CPU 505 can be a digital signal processor (DSP). In some embodiments, CPU 505 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 525 is generally included to be representative of random access memory (e.g., static random access memory (SRAM), dynamic random access memory (DRAM), or Flash). The storage 530 is generally included to be representative of non-volatile memory, such as a hard disk drive, solid-state device (SSD), removable memory cards, optical storage, and/or flash memory devices. Additionally, the storage 530 can include storage area network (SAN) devices, the cloud, or other devices connected to the STEM event identification system 500 via the I/O device interface 510 or to a network 550 via the network interface 515.

In some embodiments, the memory 525 stores instructions 560. However, in various embodiments, the instructions 560 are stored partially in memory 525 and partially in storage 530, or they are stored entirely in memory 525 or entirely in storage 530, or they are accessed over a network 550 via the network interface 515.

Instructions 560 can be processor-executable instructions for performing any portion of, or all, of the methods described in FIGS. 3-4, and/or the functionality discussed in FIGS. 1 and 2.

In various embodiments, the I/O devices 512 include an interface capable of presenting information and receiving input. For example, I/O devices 512 can present information to a listener interacting with STEM event identification system 500 and receive input from the listener.

The STEM event identification system 500 is connected to the network 550 via the network interface 515. Network 550 can comprise a physical, wireless, cellular, or different network.

In some embodiments, the STEM event identification system 500 can be a multi-user mainframe computer system, a single-user system, or a server computer or similar device that has little or no direct user interface but receives requests from other computer systems (clients). Further, in some embodiments, the SIEM event identification system 500 can be implemented as a desktop computer, portable computer, laptop or notebook computer, tablet computer, pocket computer, telephone, smartphone, network switches or routers, or any other appropriate type of electronic device.

It is noted that FIG. 5 is intended to depict the major representative components of an exemplary SIEM event identification system 500. In some embodiments, however, individual components can have greater or lesser complexity than as represented in FIG. 5, components other than or in addition to those shown in FIG. 5 can be present, and the number, type, and configuration of such components can vary.

Although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third-party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third-party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
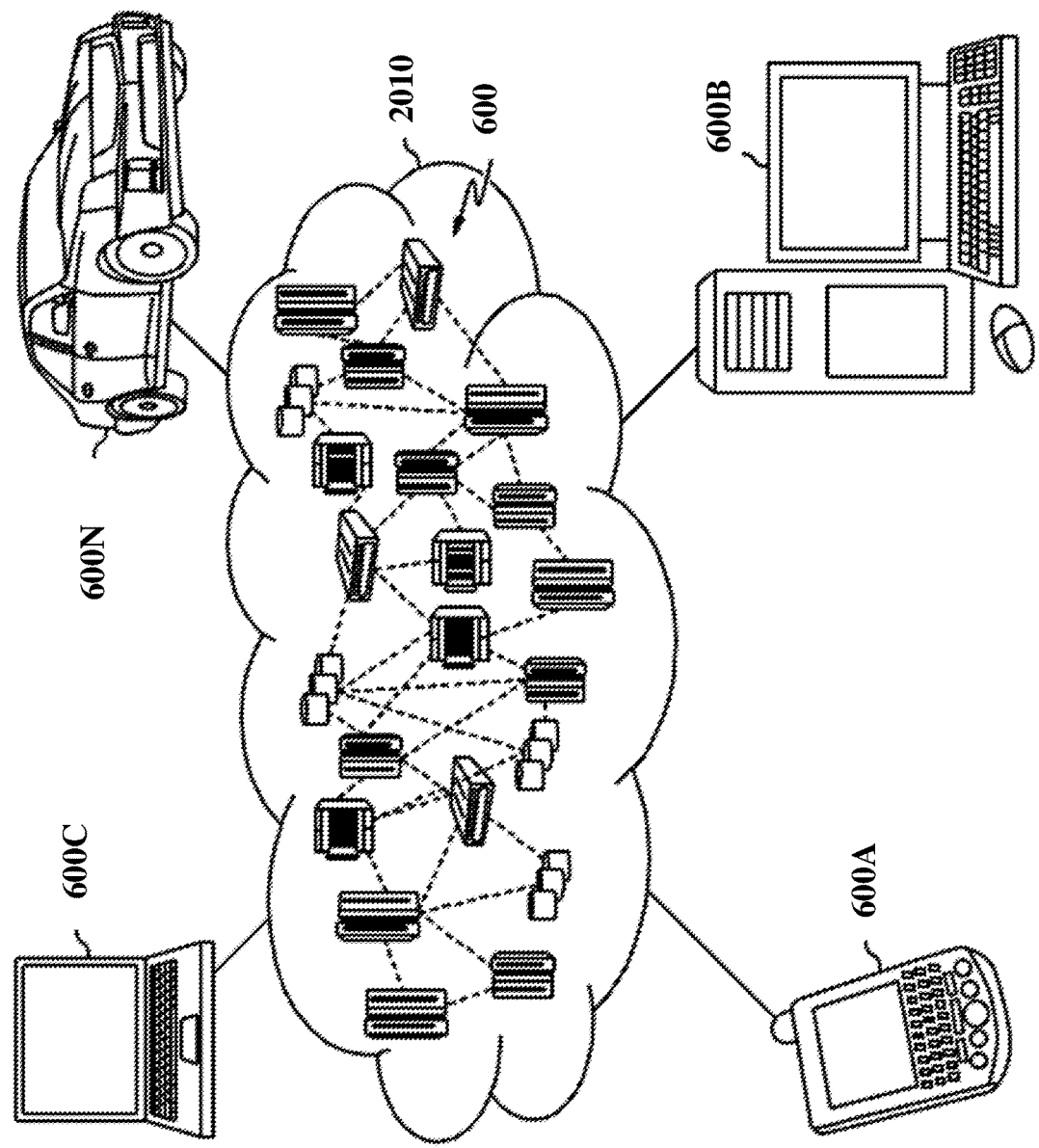
FIG. 6 is a cloud computing environment, according to some embodiments of the present disclosure.

FIG. 6 is a cloud computing environment 610, according to some embodiments of the present disclosure. As shown, cloud computing environment 610 includes one or more cloud computing nodes 600. The cloud computing nodes 600 can perform the methods described in FIGS. 3-4 and/or the functionality discussed in FIGS. 1 and 2. Additionally, cloud computing nodes 600 can communicate with local computing devices used by cloud consumers, such as, for example, personal digital assistant (PDA) or cellular telephone 600A, desktop computer 600B, laptop computer 600C, and/or automobile computer system 600N. Further, the cloud computing nodes 600 can communicate with one another. The cloud computing nodes 600 can also be grouped (not shown) physically or virtually, in one or more networks, such as Private, Community, Public, or Hybrid clouds as described hereinabove, or a combination thereof. This allows cloud computing environment 610 to offer infrastructure, platforms and/or software as services for which a cloud consumer does not need to maintain resources on a local computing device. It is understood that the types of computing devices 600A-N shown in FIG. 6 are intended to be illustrative only and that computing nodes 600 and cloud computing environment 610 can communicate with any type of computerized device over any type of network and/or network addressable connection (e.g., using a web browser).

Figure 7:
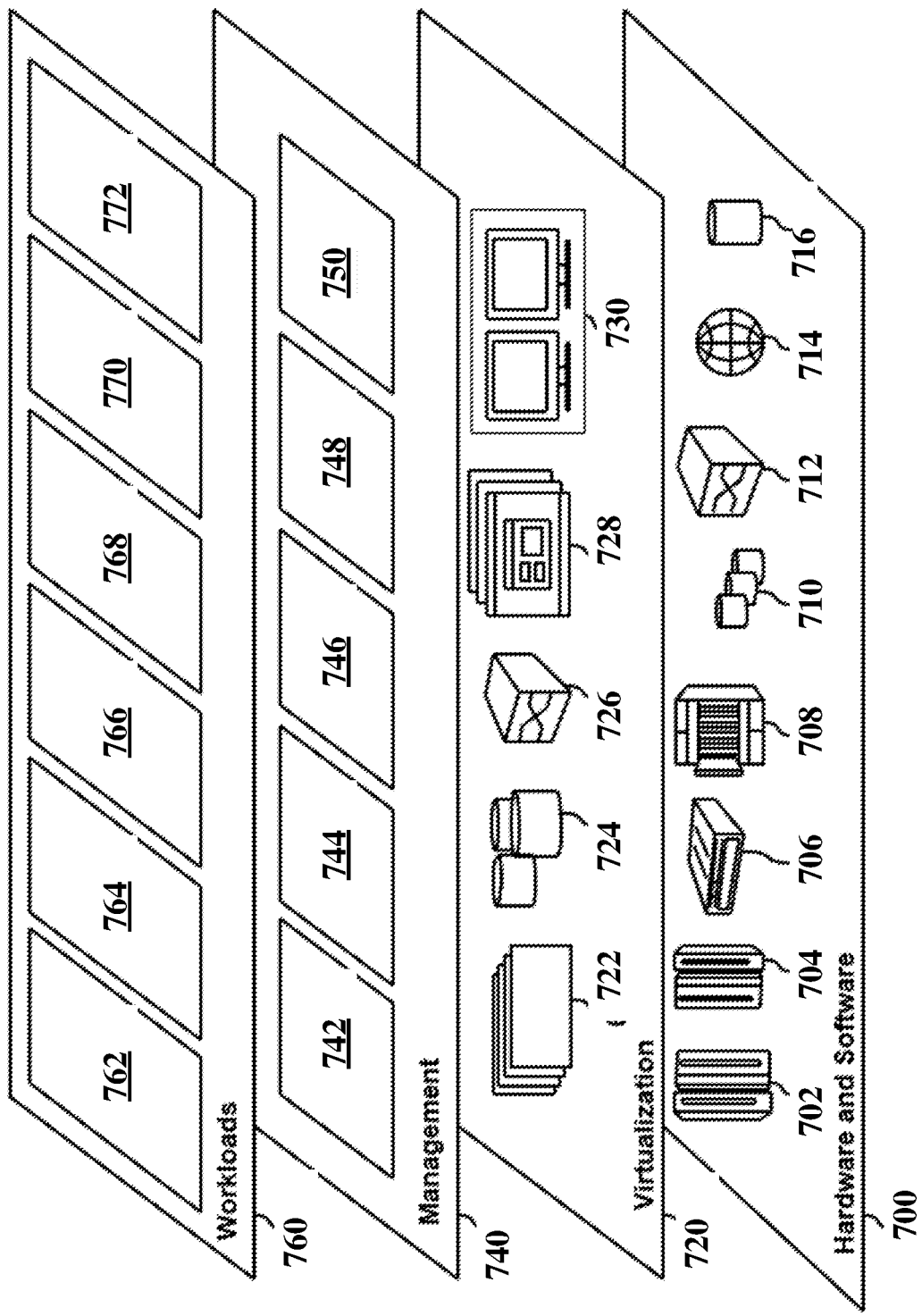
FIG. 7 is a set of functional abstraction model layers provided by cloud computing environment, according to some embodiments of the present disclosure While the present disclosure is amenable to various modifications and alternative forms, specifics thereof have been shown by way of example, in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

FIG. 7 is a set of functional abstraction model layers provided by cloud computing environment 610 (FIG. 6), according to some embodiments of the present disclosure. It should be understood in advance that the components, layers, and functions shown in FIG. 7 are intended to be illustrative only and embodiments of the disclosure are not limited thereto. As depicted below, the following layers and corresponding functions are provided.

Hardware and software layer 700 includes hardware and software components. Examples of hardware components include: mainframes 702; RISC (Reduced Instruction Set Computer) architecture based servers 704; servers 706; blade servers 708; storage devices 710; and networks and networking components 712. In some embodiments, software components include network application server software 714 and database software 716.

Virtualization layer 720 provides an abstraction layer from which the following examples of virtual entities can be provided: virtual servers 722; virtual storage 724; virtual networks 726, including virtual private networks; virtual applications and operating systems 728; and virtual clients 730.

In one example, management layer 740 can provide the functions described below. Resource provisioning 742 provides dynamic procurement of computing resources and other resources that are utilized to perform tasks within the cloud computing environment. Metering and Pricing 744 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 746 provides access to the cloud computing environment for consumers and system administrators. Service level management 748 provides cloud computing resource allocation and management such that required service levels are met. Service level management 748 can allocate suitable processing power and memory to process static sensor data. Service Level Agreement (SLA) planning and fulfillment 750 provide pre-arrangement for, and procurement of, cloud computing resources for which a future requirement is anticipated in accordance with an SLA.

Workloads layer 760 provides examples of functionality for which the cloud computing environment can be utilized. Examples of workloads and functions which can be provided from this layer include: mapping and navigation 762; software development and lifecycle management 764; virtual classroom education delivery 766; data analytics processing 768; transaction processing 770; and STEM event type identification system 772.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Example 1 is a computer-implemented method. The method includes determining that an event type of an event log of a security information and event management (SIEM) cannot be identified; generating a vectorized log using a cleaned, tokenized, and padded version of the event log; generating a classification for the vectorized log using a deep learning classification model that is trained to identify a potential event type for the event log based on deep learning training using a plurality of parsed logs; determining that a confidence level of the classification meets a predetermined threshold; and parsing the event log based on the classification.

Example 2 includes the method of example 1, including or excluding optional features. In this example, the deep learning classification model is trained by: cleaning the parsed logs; tokenizing the parsed logs; padding the parsed logs; and vectorizing the parsed logs. Optionally, tokenizing the parsed logs comprises: identifying a plurality of tokens of each of the parsed logs; and generating a log comprising the tokens. Optionally, padding the parsed logs comprises: identifying a length of a longest token of the tokens; and increasing an original length of each of the tokens to the length of the longest token with a predetermined character. Optionally, vectorizing the parsed logs comprises: assigning a unique numeric value to each of the tokens; and replacing the tokens with the assigned unique numeric value.

Example 3 includes the method of any one of examples 1 to 2, including or excluding optional features. In this example, the deep learning classification model is trained using a convolutional neural network.

Example 4 includes the method of any one of examples 1 to 3, including or excluding optional features. In this example, the parsed logs comprise a plurality of logs classified by a data source manager of a SIEM, and an event type based on the classification.

Example 5 is a computer program product comprising program instructions stored on a computer readable storage medium. The computer-readable medium includes instructions that direct the processor to determining that an event type of an event log of a security information and event management (SIEM) cannot be identified; generating a vectorized log using a cleaned, tokenized, and padded version of the event log; generating a classification for the vectorized log using a deep learning classification model that is trained to identify a potential event type for the event log based on deep learning training using a plurality of parsed logs; determining that a confidence level of the classification meets a predetermined threshold; and parsing the event log based on the classification.

Example 6 includes the computer-readable medium of example 5, including or excluding optional features. In this example, the deep learning classification model is trained by: cleaning the parsed logs; tokenizing the parsed logs; padding the parsed logs; and vectorizing the parsed logs. Optionally, tokenizing the parsed logs comprises: identifying a plurality of tokens of each of the parsed logs; and generating a log comprising the tokens. Optionally, padding the parsed logs comprises: identifying a length of a longest token of the tokens; and increasing an original length of each of the tokens to the length of the longest token with a predetermined character. Optionally, vectorizing the parsed logs comprises: assigning a unique numeric value to each of the tokens; and replacing the tokens with the assigned unique numeric value.

Example 7 includes the computer-readable medium of any one of examples 5 to 6, including or excluding optional features. In this example, the deep learning classification model is trained using a convolutional neural network.

Example 8 includes the computer-readable medium of any one of examples 5 to 7, including or excluding optional features. In this example, the parsed logs comprise a plurality of logs classified by a data source manager of a SIEM, and an event type based on the classification.

Example 9 is a system. The system includes instructions that direct the processor to a computer processing circuit; and a computer-readable storage medium storing instructions, which, when executed by the computer processing circuit, are configured to cause the computer processing circuit to perform a method comprising: determining that an event type of an event log of a security information and event management (SIEM) cannot be identified; generating a vectorized log using a cleaned, tokenized, and padded version of the event log; generating a classification for the vectorized log using a deep learning classification model that is trained to identify a potential event type for the event log based on deep learning training using a plurality of parsed logs; determining that a confidence level of the classification meets a predetermined threshold; and parsing the event log based on the classification.

Example 10 includes the system of example 9, including or excluding optional features. In this example, the deep learning classification model is trained by: cleaning the parsed logs; tokenizing the parsed logs; padding the parsed logs; and vectorizing the parsed logs. Optionally, tokenizing the parsed logs comprises: identifying a plurality of tokens of each of the parsed logs; and generating a log comprising the tokens. Optionally, padding the parsed logs comprises: identifying a length of a longest token of the tokens; and increasing an original length of each of the tokens to the length of the longest token with a predetermined character. Optionally, vectorizing the parsed logs comprises: assigning a unique numeric value to each of the tokens; and replacing the tokens with the assigned unique numeric value.

Example 11 includes the system of any one of examples 9 to 10, including or excluding optional features. In this example, the deep learning classification model is trained using a convolutional neural network.

Example 12 is a computer-implemented method. The method includes instructions that direct the processor to generating a vectorized log using a cleaned, tokenized, and padded version of the event log; generating a classification for the vectorized log using a deep learning classification model that is trained to identify a potential event type for the event log based on deep learning training using a plurality of parsed logs; determining that a confidence level of the classification meets a predetermined threshold; and parsing the event log based on the classification.

Example 13 includes the method of example 12, including or excluding optional features. In this example, the deep learning classification model is trained using a convolutional neural network. Optionally, the method includes determining that an event type of an event log of a security information and event management (SIEM) cannot be identified.

Example 14 is a computer-implemented method. The method includes instructions that direct the processor to determining that an event type of an event log of a security information and event management (SIEM) cannot be identified; generating a vectorized log using a cleaned, tokenized, and padded version of the event log; generating a classification for the vectorized log using a deep learning classification model that is trained to identify a potential event type for the event log based on deep learning training using a plurality of parsed logs; determining that a confidence level of the classification meets a predetermined threshold; and parsing the event log based on the classification.

Example 15 includes the method of example 14, including or excluding optional features. In this example, the method includes identifying a plurality of event types corresponding to the parsed logs; and training the deep learning classification model.

What is claimed is:

1. A computer-implemented method, comprising:
determining that an event type of an event log of a security information and event management (SIEM) cannot be identified;
generating a vectorized log using a cleaned, tokenized, and padded version of the event log;
generating a classification for the vectorized log using a deep learning classification model that is trained to identify a potential event type for the event log based on deep learning training using a plurality of parsed logs;
determining that a confidence level of the classification meets a predetermined threshold; and
parsing the event log based on the classification.

2. The method of claim 1, wherein the deep learning classification model is trained by:
cleaning the parsed logs;
tokenizing the parsed logs;
padding the parsed logs; and
vectorizing the parsed logs.

3. The method of claim 2, wherein tokenizing the parsed logs comprises:
identifying a plurality of tokens of each of the parsed logs; and
generating a log comprising the tokens.

4. The method of claim 2, wherein padding the parsed logs comprises:
identifying a length of a longest token of a plurality of tokens; and
increasing an original length of each of the tokens to the length of the longest token with a predetermined character.

5. The method of claim 2, wherein vectorizing the parsed logs comprises:
assigning a unique numeric value to each of the tokens; and
replacing the tokens with the assigned unique numeric value.

6. The method of claim 1, wherein the deep learning classification model is trained using a convolutional neural network.

7. The method of claim 1, wherein the parsed logs comprise a plurality of logs classified by a data source manager of a STEM, and an event type based on the classification.

8. A computer program product comprising program instructions stored on a computer readable storage medium, the program instructions executable by a processor to cause the processor to perform a method comprising:
determining that an event type of an event log of a security information and event management (SIEM) cannot be identified;
generating a vectorized log using a cleaned, tokenized, and padded version of the event log;
generating a classification for the vectorized log using a deep learning classification model that is trained to identify a potential event type for the event log based on deep learning training using a plurality of parsed logs;
determining that a confidence level of the classification meets a predetermined threshold; and
parsing the event log based on the classification.

9. The computer program product of claim 8, wherein the deep learning classification model is trained by:
cleaning the parsed logs;
tokenizing the parsed logs;
padding the parsed logs; and
vectorizing the parsed logs.

10. The computer program product of claim 9, wherein tokenizing the parsed logs comprises:
identifying a plurality of tokens of each of the parsed logs; and
generating a log comprising the tokens.

11. The computer program product of claim 9, wherein padding the parsed logs comprises:
identifying a length of a longest token of a plurality of tokens; and
increasing an original length of each of the tokens to the length of the longest token with a predetermined character.

12. The computer program product of claim 9, wherein vectorizing the parsed logs comprises:
assigning a unique numeric value to each of the tokens; and
replacing the tokens with the assigned unique numeric value.

13. The computer program product of claim 8, wherein the deep learning classification model is trained using a convolutional neural network.

14. The computer program product of claim 8, wherein the parsed logs comprise a plurality of logs classified by a data source manager of a SIEM, and an event type based on the classification.

15. A system comprising:
a computer processing circuit; and
a computer-readable storage medium storing instructions, which, when executed by the computer processing circuit, are configured to cause the computer processing circuit to perform a method comprising:
determining that an event type of an event log of a security information and event management (SIEM) cannot be identified;
generating a vectorized log using a cleaned, tokenized, and padded version of the event log;
generating a classification for the vectorized log using a deep learning classification model that is trained to identify a potential event type for the event log based on deep learning training using a plurality of parsed logs;
determining that a confidence level of the classification meets a predetermined threshold; and
parsing the event log based on the classification.

16. The system of claim 15, wherein the deep learning classification model is trained by:
cleaning the parsed logs;
tokenizing the parsed logs;

padding the parsed logs; and vectorizing the parsed logs.

17. The system of claim 16, wherein tokenizing the parsed logs comprises:

identifying a plurality of tokens of each of the parsed logs; and generating a log comprising the tokens.

18. The system of claim 16, wherein padding the parsed logs comprises:

identifying a length of a longest token of a plurality of tokens; and increasing an original length of each of the tokens to the length of the longest token with a predetermined character.

19. The system of claim 16, wherein vectorizing the parsed logs comprises:

assigning a unique numeric value to each of the tokens; and replacing the tokens with the assigned unique numeric value.

20. The system of claim 15, wherein the deep learning classification model is trained using a convolutional neural network.

21. A computer-implemented method, comprising:

generating a vectorized log using a cleaned, tokenized, and padded version of an event log;

generating a classification for the vectorized log using a deep learning classification model that is trained to identify a potential event type for the event log based on deep learning training using a plurality of parsed logs;

determining that a confidence level of the classification meets a predetermined threshold; and parsing the event log based on the classification.

22. The method of claim 21, wherein the deep learning classification model is trained using a convolutional neural network.

23. The method of claim 1, further comprising determining that an event type of the event log of a security information and event management (SIEM) cannot be identified.

24. A computer-implemented method, comprising:

identifying a plurality of event types corresponding to the parsed logs;

training a deep learning classification model based on the identified event types;

determining that an event type of an event log of a security information and event management (SIEM) cannot be identified;

generating a vectorized log using a cleaned, tokenized, and padded version of the event log;

generating a classification for the vectorized log using a deep learning classification model that is trained to identify a potential event type for the event log based on deep learning training using a plurality of parsed logs;

determining that a confidence level of the classification meets a predetermined threshold; and parsing the event log based on the classification.

25. The method of claim 24, wherein the deep learning classification model is trained using a convolutional neural network.

\* \* \* \* \*